3,706,730
METHOD OF CONTROLLING ETHERIFICATION OF GRANULE STARCH WITH AN ALKALI-CONSUMING ETHERIFYING REAGENT
Erling T. Hjermstad and Otto J. Rajtora, Cedar Rapids, Iowa, assignors to Penick & Ford Limited, Cedar Rapids, Iowa
Filed Mar. 1, 1971, Ser. No. 119,480
Int. Cl. C08b 19/06
U.S. Cl. 260—233.3 R           15 Claims

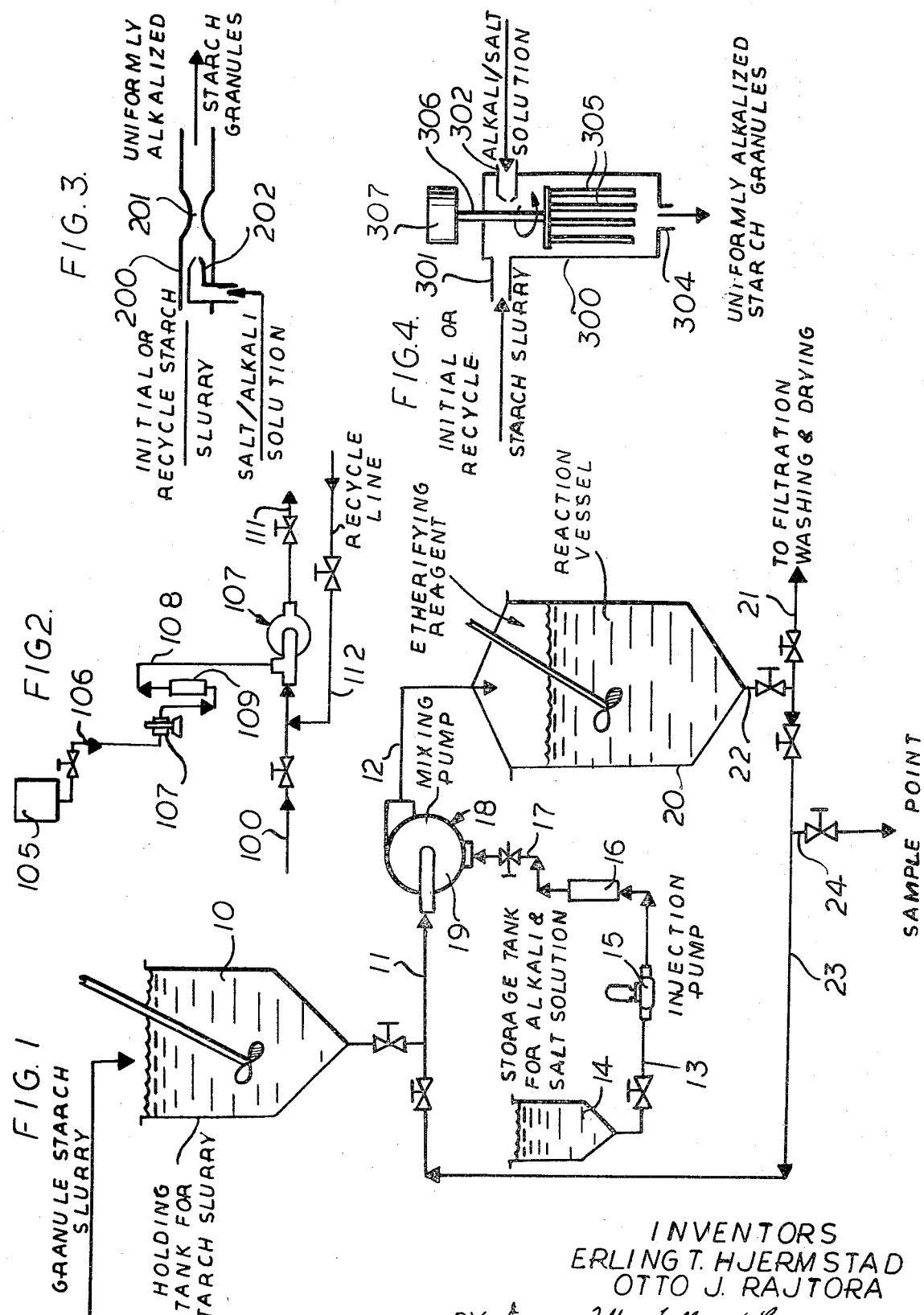

ABSTRACT OF THE DISCLOSURE

Granule starch is etherified with an alkali-consuming etherifying reagent, such as an alkyl or aralkyl halide, using an alkali etherification catalyst while maintaining the starch in a filterable state with a reduced amount of an inorganic salt starch swelling inhibitor, such as sodium chloride or sodium sulfate. In the method, a water suspension of granule starch, with limited quantities of the alkali etherification catalyst and the salt inhibitor, is reacted in a batch-type reaction vessel with the alkali-consuming etherifying reagent. During the course of the reaction, portions of the reaction mixture are withdrawn and formed into a turbulently flowing stream outside the reaction vessel. There is injected into this stream, a water solution of additional amounts of the alkali etherification catalyst, and the withdrawn portions are returned to the reaction vessel with the alkali in admixture therewith. The additional amounts of alkali catalyst are proportioned to maintain limited and controlled concentrations thereof in the reaction vessel.

CROSS REFERENCE

This application is related to our co-pending application Ser. No. 774,694, filed Nov. 12, 1968, now Pat. No. 3,632,803.

BACKGROUND

The etherification of granule starch with alkali consuming reagents is well known in the starch modification art, and has been practiced commercially by the starch industry in the United States for many years. Preparation of starch alkyl, aralkyl, and substituted alkyl ethers in the ungelatinized granule form is described in certain basic U.S. patents, including U.S. Pats. 2,773,057, 3,062,810, and 3,462,283. Products prepared according to the procedures described in these patents have been in commercial production by Penick & Ford, Ltd. and are being used by the paper and textile industries.

Basically, the process as described in these patents provided a means for significantly modifying the properties of starch by etherification of starch with alkyl halides, aralkyl halides, and substituted alkyl halides, while at the same time maintaining the filterability of the starch. This was accomplished by incorporating alkali, such as sodium hydroxide, in the water suspension in an amount sufficient to promote the etherification reaction without at the same time swelling the starch to a non-filterable condition at the temperature of the reaction. Because of the relatively large quantities of total alkali required to promote starch reactions with alkali-hydrolyzing reagents a critical feature of these processes involved the inclusion of substantial quantities of water-soluble salts of an alkali metal or alkaline earth metals to inhibit the swelling of the starch. In commercial practice the most widely used salt swelling inhibitors have been sodium chloride and sodium sulfate.

By etherifying the starch granules while maintaining them in a relatively non-swollen state, the etherified product can be dewatered by filtration or centrifugation, and can be further purified by washing, after neutralization of the alkali to salts. The washing is usually conducted by resuspending the filtered starch, and then again dewatering by centrifugation or filtration, to remove additional salts. The product is then subjected to final drying to produce the modified starch in free-flowing granule form, which can then be formed into a paste, as required for use in the paper or textile industries.

THE PROBLEM

Since the etherification of starch with alkyl halides or other monofunctional alkali consuming etherifying reagents, is a process requiring considerable reaction time, and involves the addition of an etherifying agent, alkali, and swelling inhibitors, it is common practice in the starch industry for the reaction to be carried out in large batch-type reaction vessels. These large reaction vessels are equipped with stirring devices to maintain the starch in uniform suspension, and include means, such as a sparger, for the introduction of the etherifying reagent. In the existing commercial practice, the reactor is charged with a water suspension of the granule starch to be reacted. The next step is the addition of the alkali catalyst, which is usually accompanied by the salt inhibitor, both being dissolved in water solution.

Since it is well known that local overconcentrations of alkali can produce irreversible swelling of the starch granules (even in the presence of an inhibitor salt), the practice has been to add the alkali and salt solution gradually with continual stirring until the required amount of catalyst has been distributed throughout the suspension.

Customarily, the alkali solution or alkali-salt solution is added to the surface of the starch slurry in the agitated reaction vessel. To achieve minimum overall production time for each batch, it is desired to add the alkali at as rapid a rate as possible with out causing any significant irreversible swelling of the starch granules. The practice has been to control the rate of alkali addition to avoid localized starch gelatinization, as evidenced by the development of so-called "fisheyes." These are sticky lumps of gelatinized starch which are formed in the area immediately surrounding the contact point of the starch slurry and the incoming alkali stream if the rate of addition is too rapid. These lumps or fisheyes must be removed before the starch is dewatered and dried, since otherwise they will contaminate the starch with dried, horny particles which do not disperse readily in water even when the starch is gelatinized at elevated temperatures. Further, such alkali swollen starch represents a waste of starch if removed and is a deleterious contaminant if not removed.

While the problem of localized starch gelatinization is inherent in any starch etherification process requiring the addition of strong alkali, it is much more critical when alkali-consuming reagents are used than when etherifications are conducted with non-alkali consuming reagents, such as epoxides or reagents forming ethers by 1, 4 addition. With these latter reagents it is only necessary to add sufficient alkali to promote an efficient reaction with starch and, because the alkali is not consumed, the reaction rate and efficiency is maintained without further alkali additions. When alkali consuming reagents are used the alkali level tends to drop below that which is required to promote an etherification, especially with reagents which resist alkaline hydrolysis, for example, alkyl chlorides and aralkyl chlorides. For this reason, prior art processes required the addition of relatively large proportions of alkali at the beginning of the reaction. Since large proportions of strong alkali, such as NaOH or KOH, tend to swell starch or starch ethers to an unfilterable, gummy mass, it was necessary to add relatively large proportions of neutral alkali metal salts, such as sodium chloride or sodium sulfate to keep the high proportion of alkali from gelatinizing the starch-ether product. This is illustrated in U.S. Pat. 2,773,057 where proportions of NaOH as high as 5% on the starch are used in starch suspensions containing 15–20% NaCl based on water in the suspension. Similarly, U.S. Pat. 3,462,283 shows the use of up to 20% salt based on water and 35% $Na_2SO_4$ based on starch when 9% by weight of NaOH based on starch is added during reaction of granule starch with benzyl chloride. U.S. Pat. 2,858,305 shows the use of 13.5% $Na_2SO_4$ based on starch during reaction of dimethyl sulfate with starch at pH 10–11. U.S. Pat. 2,813,093 shows the addition of 50% $Na_2SO_4$ and 4% NaOH based on starch (Example I) and 3% NaOH and 30% $Na_2SO_4$ based on starch (Example VIII) for the reaction of beta diethyl amino ethyl chloride hydrochloride with starch in water suspensions. U.S. Pat. 3,046,272 shows the use of 20% $Na_2SO_4$ based on starch during reaction of starch with gamma butane sultone at pH 11 in a water suspension of ungelatinized starch granules (Example II). Many other prior art processes have been disclosed wherein sodium chloride or sodium sulfate are present in rather high proportions to prevent swelling of the starch ether products and keep them in a filterable and washable state.

While the use of high proportions of such salts provides a means of producing washable starch ether products in the unswollen granule form there are several disadvantages. Starch and starch ethers are relatively low-priced and even though salts such as sodium chloride and sodium sulfate are also low-priced, their use in such high proportions relative to the starch ethers adds significantly to the costs of their production. High proportions of salts necessitate increased consumption of wash water and more washing cycles to purify the starch ether product. Another very serious problem is the disposal of wash water containing salts. These salts interfere with fermentation processes if the wash water is discharged to sewage disposal facilities and are an undesirable contaminant when such sewage effluents are discharged into rivers. There has therefore been a need to develop processes which use much lower proportions of salt than those currently in operation and which still result in filterable and washable starch ether products, especially when alkali-consuming etherifying agents are used.

It would appear that a simple solution to the above problem would be to keep the maximum proportion of alkali present at any time at the lowest feasible reaction-promoting level and then add alkali intermittently or continuously as it is consumed during the reaction. This should greatly lower the proportion of salt required to protect against swelilng. This, however, has not heretofore been feasible in commercial production because etherified starch has a lower swelling temperature and is much more susceptible to swelling by local high concentrations of alkali. It was generally considered to be impractical to add alkali to suspensions of starch which had appreciable ether group substitution because this caused alkali swollen lumps, "fisheyes," etc., and such partially swollen suspensions were difficult or impractical to dewater on filters and wash to a pure state. Because of the tendency of even dilute NaOH or KOH solutions to instantly gelatinize etherified starch no means was known of getting such alkali well dispersed into the starch suspension except through the use of relatively high proportions of swelling inhibitors.

In our prior co-pending application, Ser. No. 774,694, cited above, a method is disclosed of controlling the etherification of starch granules in large batch-type reaction vessels to improve filterability and reduce loss of solubles. The method is applicable to the reaction of granule starch with alkali-consuming agents. Where the amount of the alkali-consuming etherifying reagent to be reacted with the starch is relatively low, that is, below .05 mole of the etherifying reagent per $C_6H_{10}O_5$ mole (anhydroglucose unit) of starch, the method of said co-pending application can be used for the complete reaction process. Where higher levels of substitution are desired, however, undesirably high concentrations of the inhibitor salt are required in the reaction vesel, subjecting the process to the disadvantages and penalties described above.

SUMMARY OF THE INVENTION

The method of the present invention preferably starts with a reaction mixture in a batch-type vessel which reaction mixture has been formed by the process of our co-pending application, Serial No. 774,694, now Pat. No. 3,632,803. However, the advantage of reducing the required concentration of inhibitor salt in the reaction mixture can be at least partially obtained, in the present process, even though the initial charge to the reaction mixture is formed by the well-known direct addition process described above, in which the alkali catalyst and the salt inhibitor are added directly to the reaction vessel. In either case, however, with the method of the invention, the initial concentration of the alkali catalyst and of the salt inhibitor are limited. More specifically, the amount of alkali catalyst present at the start of the reaction is considerably less than that required to complete the reaction, the amount of catalyst present being substantially less than the amount required to react with all of the alkali-consuming etherifying agent to be reacted with the starch. The amount of salt inhibitor present is limited to only the amount required to control the swelling of the starch during the reaction in the presence of the limited alkali concentration, the amount of inhibitor therefore being much less than that which would have been required to prevent swelling of the starch to a non-filterable state if all of the alkali reagent had been present initially.

The reaction is started, according to known practice, by gradually adding the alkali-consuming etherifying agent to the reaction mixture in the reaction vessel, the temperature of the reaction mixture being controlled to promote the reaction of the starch with the etherifying reagent without swelling the starch to a non-filterable state. As the reaction proceeds, the concentration of the alkali catalyst is reduced due to the consumption of the catalyst by the etherifying reagent. This progress of the reaction is followed analytically, and a special technique is then used for adding additional increments of the alkali catalyst.

More specifically, during the course of the reaction, portions of the reaction mixture are withdrawn and formed into a turbulently flowing stream outside the reaction vessel. Into this turbulent flowing stream, there is injected a water solution of additional amounts of the alkali etherification catalyst to replenish the alkali catalyst consumed by the reaction with the etherifying reagent. The withdrawn portions of the reaction mixture are returned to the reaction vessel with the injected solution in admixture therewith. The advantages of the present invention are achieved by proportioning the added solution of the alkali catalyst to maintain the alkali catalyst and the salt inhibitor in the reaction vessel with control limits. As required, additional increments of the salt inhibitor can be added, either with the alkali catalyst, or directly to the reaction vessel.

In the subsequent detailed description, the specific control ranges for the alkali catalyst and the salt inhibitor will be set out and described, and other important operating details will be set forth.

THE DRAWINGS

The accompanying drawings illustrate embodiments of the present invention, wherein FIG. 1 is a diagrammatic flow sheet illustrating how the method of this invention, in a preferred embodiment, can be incorporated in a plant processing operation;

FIG. 2 is a partial flow sheet illustrating another procedure for practicing the method of this invention;

FIG. 3 is a schematic view illustrating how an in-line jet type mixer can be employed for the alkali and salt additions; and FIG. 4 is a schematic view illustarting how an in-line motor-driven mixer can be employed for the alkali and salt additions.

DETAILED DESCRIPTION

In a preferred embodiment, the present process involves the in-line addition of alkali soltuion, or of mixtures of an alkali and a swelling inhibitor, to the starch suspension as it is being recycled in and out of the reaction vessel. It is desirable to provide a zone of efficient agitation or high turbulence including and/or immediately following the point of addition of the alkali. As described in copending application Ser. No. 774,694, this can be accomplished by injecting the alkali solution into a pump or similar device through which the starch suspension is passing during transfer to the treating tank. The alkali solution is metered in at a rate sufficient to give the ratio of active alkali to starch solids which is desired in the treating tank.

Any device which can be adapted to produce high turbulence in a moving stream of starch suspension is suitable for the "in-line" alkali addition. For optimum results, the two streams immediately following initial contacting should be subjected to a degree of agitation and turbulence sufficient to substantially instantaneously produce a uniform mixture. Various types of pumps, such as centrifugal pumps, gear pumps, impeller pumps, etc., can be fitted with an inlet for the addition of alkali solution to achieve the desired proportionate instantaneous mixing. In-line mixers, such as static baffle mixers, motor-driven mixers, and jet-type mixers can also be used.

The starch suspension into which the alkali solution is injected may be at any solids concentration provided that it is fairly mobile or fluid and capable of being agitated to a highly turbulent state. Thus, normal, ungelatinized starches can be treated at starting concentrations up to around 43% (dry starch solids by weight( depending upon the variety of starch and the temperature of the suspension. Usually, the concentration at the start of the reaction will range from 35–40%, depending upon the extent of subsequent additions. All varieties of starch, including corn, milo, potato, waxy-maize, wheat, rice, tapioca, etc., can be treated successfully. Modified or derivatized starches which are still in the cold-water-insoluble, unswollen granule form are also susceptible to uniform alkali addition by the present process; for example, thin-boiling starches, starch ethers, oxidized starches, etc. The process has particular value for etherification of granule starch which is subsequently thinned by acids or oxidizing agents.

While any type of alkali may be added uniformly to starch suspensions by the present process, the greatest benefit is derived when alkali which has a strong starch-swelling tendency is added. Therefore, the method is especially suitable for the addition of alkali metal hydroxides, particularly sodium and potassium hydroxide. Other alkalis, such as calcium or barium hydroxide or quaternary alkyl ammonium hydroxides are also capable of swelling starch during conventional addition procedures and their uniformity of addition to starch is greatly improved by the present process.

While the proportion of alkali which can be present in the starch suspension may range up to 5 parts per 100 parts of starch solids if high proportions of salt are used to prevent alkali swelling, it has been found that such high proportions are not necessary, provided the alkalinity is maintained at a level sufficient to promote the reaction. Proportions of 0.5 to 4.0 parts NaOH or equivalent alkali per 100 parts of dry starch solids can be used. It is preferred to control the alkalinity to from 1.5 to 3.5 parts alkali per 100 parts by weight of dry starch solids. It has been found that lower proportions of swelling-inhibiting salts are required if the alkalinity does not exceed these levels. Proportions of sodium chloride or sodium sulfate ranging from 3 to 15 parts of the salt inhibitor per 100 parts of initial water in the suspension should be added, preferably with the alkali at the start of the reaction. Proportions in the range of 3 to 12 parts by weight salt per 100 parts water are preferred. Additional salt can be added along with subsequent alkali additions, and/or added directly to the reaction vessel. The total salt present should preferably be maintained within the same ranges based on the total water present at any time during the reaction. For the in-line alkali additions during the reaction, usually from 0.5 to 2.5 parts by weight of salt per part of alkali will be added. In one procedure for limiting the added salt, the addition is kept below 1 part by weight per part of make-up alkali down to no (zero) parts added salt.

The control method of the present invention achieves its greatest benefits for the alkali-catalyzed reaction of starch with monofunctional etherifying reagents which heretofore have required a relatively high alkalinity for efficient reaction. These etherifying reagents are the class of organic etherifying reagents which consume alkali by a hydrolysis reaction with the alkali catalyst during the course of the reaction. Such reagents are well known to the starch etherifying art, including, for example, halide-type etherifying reagents and sultone-type etherifying reagents. The principal halide reagents are alkyl halides, or the aralkyl halides where the halide atom is attached to a single-bonded carbon atom of the alkyl groups. Examples of such reagents are described in U.S. Pat. 3,062,810. The reagents of principal commercial importance are the monochlorine substituted organic etherifying reagents reacting monofunctionally with starch and in which the chlorine atom is attached to a single-bonded carbon atom in the aliphatic chain. The sultone may be either aliphatic or aromatic and include alkyl and aryl sultones. Specific reagents within these classes are:

(I) Halides

Ethyl chloride
Methyl chloride
Allyl chloride
Methallyl chloride
Sodium monochloracetate
Chlorobutenyl trimethylammonium chloride
Octenyl chloride
Sodium monochlorpropionate
Dodecenyl chloride
Diethyl aminoethyl chloride
Bromobutyl trimethyl ammonium chloride
2-chloroethane sulfonate
3-chloro-2-hydroxypropane sulfonate
Benzyl chloride
3-chloro propenyl benzene
p-chloro benzyl chloride
p-nitro-benzyl chloride (II) Sultones Propane sultone
Butane sultone
Benzyl sultone
Tolyl sultone The present process affords a means of obtaining starch ether derivatives having relatively high degrees of substitution while using relatively low proportions of salt to prevent swelling. Previous processes in which low proportions of salt were used were suitable only for preparing low-substituted derivatives resulting from the reaction of from 0.005 to 0.05 mole of alkali-consuming reagent with starch, as shown in the examples of U.S. Pat. 2,773,057. The present process is suitable for preparing starch ethers having considerably higher degrees of substitution and generally would be used to prepare starches reacted with above .05 mole of reagent per $C_6H_{10}O_5$ mole of starch and preferably above .08 mole of reagent per $C_6H_{10}O_5$ mole of starch.

The metered addition of the alkali or alkali-salt solution can be carried out at any temperature at which the slurry can be pumped up to the desired reaction temperature. Etherification reactions are usually conducted at a temperature below 135° F. and more commonly between 100° and 130° F.

Alkali-consuming etherifying agents such as alkyl chloride and aralkyl chlorides may be difficult to hydrolyze at low temperatures. Consequently, in practicing the method of this invention with halide-type reagents, temperatures above 110° F. are desirable. The preferred reaction temperature, for example, for alkyl chlorides, substituted alkyl chlorides, and aralkyl chlorides at the limited alkali and salt levels maintained in the present process range from about 115°–130° F. With sultones the reaction temperature may be lower, preferably from 90°–120° F. In general, it will be understood that the reaction temperatures should be high enough to promote the etherification reaction without causing the starch to swell to a nonfilterable state.

The salt swelling inhibitors usable in the method of the present invention are the same as those previously used in the prior art process for etherification of starch with alkylene oxides, alkyl halides, and other etherifying reagents requiring high levels of alkalinity. The most commonly used swelling inhibitors are sodium chloride and sodium sulfate, but other alkali metal salts can be used. These include, for example, neutral alkali metal salts (sodium or potassium) such as alkali metal halides and sulfates. Preferably, a water solution of the alkali and the inhibitor salt is formed and continuously metered into the turbulently flowing stream of the starch slurry in the uniformly proportioned amount, the proportion being such as to achieve a predetermined alkali-to-starch solids concentration for the etherification reaction.

The method of this invention is further illustrated by the following examples:

EXAMPLE 1

Etherification of starch in water suspension using alkyl chlorides

A suspension of commercial, ungelatinized starch at 35–40% solids concentration is passed through a centrifugal pump at a rate of 250 to 300 (viz. 270) gallons per minute. A mixture 30% NaOH and 26% NaCl containing from 1–3% (viz. 2%) NaOH based on total starch solids and from 4–8% (viz. 6%) NaCl based on total initial water in the suspension is injected into the starch stream under pressure at a point in the pump housing just below the starch inlet at a rate adjusted to add from 1–3 (viz. 2) parts of dry basis NaOH per 100 parts of starch solids. The alkaline suspension is passed to a large batch-type reaction vessel (viz. a 15,000 gallon vessel), and there is added an alkyl chloride capable of reacting monofunctionally with alkaline starch, for example, one of the following:

Methyl chloride
Ethyl chloride
Butyl chloride
Amyl chloride
Allyl chloride
Methallyl chloride
Octenyl chloride
Dodecenyl chloride The alkyl chloride reaction is conducted in the reaction vessel at a temperature within the range of 110°–130° F. (viz. 120° F.). The rate of reaction or hydrolysis of the alkyl chloride is followed by periodically titrating an aliquot of the suspension with standard acid solution to determine the alkali consumption. As the alkalinity becomes lower additional alkali in the form of a solution having from 5–15% NaOH concentration and from 0 to 15% NaCl concentration is injected into a stream of the reaction suspension which is being pumped in and out of the reaction vessel through a recycle line. By this means the alkalinity of the reaction suspension is maintained at a level between 1 and 3 parts of NaOH per 100 parts of starch solids. More NaCl can be added, either with the additional alkali, or directly to the reaction vessel to maintain the total added salt concentration within the range from 4–8% NaCl based on the total water present at any time. The reaction is continued until from 0.05 to 0.5 (viz. 0.2) mole of alkyl chloride per $C_6H_{10}O_5$ mole of starch has been hydrolyzed as indicated by the cumulative amount of alkali consumed. The suspension of etherified starch is neutralized, if desired, or left in the alkaline state. Since it is in the ungelatinized granule form it is purifiable by dilution and dewatering or suitable combinations of dilution, dewatering, and washing of the filter cake.

The above process uses a relatively low proportion of salt to prevent swelling as contrasted with the proportions of salt which were added initially to the high alkalinity suspensions in the examples of U.S. Pat. 2,773,057 and 3,462,283.

EXAMPLE 2

Etherification of starch in water suspension using sultones or substituted alkyl chlorides containing hydrophilic groups The procedure of Example 1 is followed except that the following etherifying agents are used and the proportions of reagent hydrolyzed range from 0.03 to 0.10 mole per $C_6H_{10}O_5$ mole of starch:

sodium monochloracetate
sodium monochlorpropionate
2-chloroethanesulfonate
3-chlorohydroxypropane sulfonate
diethyl amino ethyl chloride hydrochloride
4-chloro, 2,3-butenyl trimethyl ammonium chloride
4-bromo butyl trimethyl ammonium chloride
propane sultone
butane sultone
benzyl sultone
tolyl sultone

EXAMPLE 3

Etherification of starch in water suspension using aralkyl chlorides

Commercial, ungelatinized starch suspension at 35–40% solids concentration is pumped to a pilot plant reaction vessel through an "in-line" mixer (e.g. centrifugal pump) at a rate of 1–10 gallons per minute. A mixture of 30% NaOH solution containing from 2–3% of dry basis NaOH based on total starch solids and 26% NaCl solution containing from 4%–10% NaCl based on total initial water in the suspension is injected into the starch suspension stream in the "in-line" mixer at the point of maximum turbulence at a rate adjusted to add from 2–3 parts of dry basis NaOH per 100 parts of starch solids. To the alkaline suspension is added an aralkyl chloride capable of reacting monofunctionally with alkaline starch to introduce groups attached by the ether linkage, for example, one of the following:

benzyl chloride
3-chloro propenyl benzene
ring-substituted benzyl chloride such as p.chloro-benzyl chloride The aralkyl chloride reaction is conducted at a temperature within the range of 115°–130° F. The rate of reaction is followed by periodically titrating an aliquot of the suspension with standard acid solution to determine the alkali consumption. As the alkalinity becomes lower additional alkali in the form of a solution having from 5–15% NaOH concentration and from 0 to 15% NaCl concentration is injected into a stream of the reaction suspension in an "in-line" mixer through which the reaction suspension is being circulated in and out of the reaction vessel. By this means the alkalinity of the reaction suspension is maintained at a level between 1 and 3 parts of NaOH per 100 parts of starch solids. The reaction is continued until from 0.05 to 0.5 mole of aralkyl chloride per $C_6H_{10}O_5$ mole of starch has been hydrolyzed, as indicated by the cumulative amount of alkali consumed. The suspension of etherified starch is neutralized, if desired, or left in the alkaline state. Purification by dilution and dewatering or suitable combinations of dilution, dewatering, and washing of the filter cake is feasible due to the ungelatinized granule form of the starch ether products.

The above process uses relatively low proportions of salt to prevent swelling as contrasted with the proportions of salt which were added to reaction suspensions shown in the examples of U.S. Pats. 3,462,283 and 2,773,057 (Example VI).

EXAMPLE 4

Etherification of starch in water suspension with benzyl chloride

Unmodified corn starch was reacted with benzyl chloride according to the process of Example 3. Varying proportions of benzyl chloride were hydrolyzed. The products were characterized as to their rate of dewatering on purification and their benzyl group content after purification. The results are summarized below:

BENZYL CORN STARCH PREPARED WITH INTERMITTENT ADDITION OF ALKALI BY "IN-LINE" PROCEDURE

| Total benzyl chloride hydrolyzed (percent on starch) | Number of alkali additions | Dewatering rate on filter | Benzyl content of purified product (percent) |
|---|---|---|---|
| 7.5 | 2 | Fast | 3.1 |
| 15.0 | 3 | do | 6.35 |
| 21.0 | 4 | do | 9.4 |
| 31.5 | 5 | do | 10.9 |
| 72.6 | 9 | do | 23.9 |

EXAMPLE 5

Etherification of corn starch to 8-9% benzyl content

Unmodified corn starch was reacted with benzyl chloride according to the process of Example 3 at varying reaction temperatures. The proportion of NaCl which was required to prevent swelling to an unfilterable condition at given alkali levels is summarized in the table below:

SODIUM CHLORIDE REQUIRED AT DIFFERENT TEMPERATURE AND NaOH LEVELS FOR 8-9% BENZYL CONTENT STARCH PREPARED USING INTERMITTENT ADDITION OF ALKALI BY "IN-LINE" PROCEDURE

| Reaction temperature maintained (° F.) | NaOH range during reaction (percent on starch) | Initial NaCl added with NaOH (percent on init. water) | Subsequent NaCl added with NaOH (percent on init. water) | Approx. reaction time to attain 8-9% benzyl content (hours) | Reaction efficiency (percent of theoretcial) |
|---|---|---|---|---|---|
| 120 | 1.3-2.75 | 4 | 2.6 | 112 | 68 |
| 120 | 1.0-3.0 | 6 | 2.0 | 105 | 72 |
| 125 | 0.7-2.5 | 4 | 2.1 | 120 | 64 |
| 125 | 1.0-3.0 | 8 | 2.0 | 97 | 67.5 |
| 130 | 1.0-3.0 | 10 | 2.0 | 79 | 70.0 |

The above shows the relatively low proportions of salt required in the present process as contrasted with the use of 20% NaCl on water in the preparation of benzyl starch in U.S. 2,773,057 (Example VI) and the use of up to 26% NaCl on water in U.S. Pat. 3,462,283.

EXAMPLE 6

Etherification of thin-boil starch in water suspension using benzyl chloride

The procedure of Example 3 was followed except that a 70 alkali fluidity, acid-converted corn starch was reacted with benzyl chloride to four different levels while maintaining NaOH level between 1 and 2.5% based on starch solids and adding initially 5% NaCl based on initial water. Proportions of benzyl chloride hydrolyzed and analyses of products are given in the table below:

BENZYL-THIN-BOILING CORN STARCH PREPARED WITH INTERMITTENT ADDITION OF ALKALI BY "IN-LINE" PROCEDURE

| Total benzyl chloride hydrolyzed (percent on starch) | Number of alkali additions | Dewatering rate on filter | Benzyl content of purified product (percent) |
|---|---|---|---|
| 10 | 2 | Fast | 4.1 |
| 15 | 3 | do | 5.23 |
| 22 | 4 | do | 7.75 |
| 26 | 5 | Slow | 10.0 |

The above data show that filterable starch ethers can be prepared using low salt proportions even with high fluidity thin-boiling starch.

EXAMPLE 7

Etherification of starch in water suspension using $Na_2SO_4$ as a swelling inhibitor The procedures given in Examples 1, 2, and 3 are used except that $Na_2SO_4$ is used weight-for-weight instead of NaCl. The starch ethers are readily filterable.

EXAMPLE 8

Etherification of starch with benzyl chloride using reaction mixture initially formed by conventional process To a suspension of unmodified corn starch at 35-40% solids concentration is added a mixture of 30% NaOH solution containing 2% dry basis NaOH based on total starch and 26% NaCl solution containing 4% NaCl based on total initial water in the suspension. The alkali-salt mixture is added directly to the suspension over a period of 2 hours and with sufficient agitation to distribute the alkali through the suspension without formation of gelatinized lumps due to the swelling effect of the alkali. Benzyl chloride is added to the suspension and the reaction conducted at a temperature within the range of 115–120° F. The rate of the reaction is followed by periodically titrating an aliquot of the suspension with standard acid solution to determine the alkali consumption. When the alkali level approaches 1% on starch solids additional alkali in the form of a solution having 15% NaOH concentration and 13% NaCl concentration is injected into a stream of the reaction suspension in an "in-line" mixer through which the reaction suspension is being circulated in and out of the reaction vessel. By this means the alkalinity of the reaction suspension is maintained at a level between 1 and 2.5% NaOH on starch solids. The reaction is continued until 21–22% by weight of benzyl chloride based on starch solids has been hydrolyzed, as indicated by the cumulative amount of alkali consumed. The suspension of etherified starch is neutralized, if desired, or left in the alkaline state. Purification by dilution and dewatering or suitable combinations of dilution, dewatering, and washing of the filter cake is feasible due to the ungelatinized granule form of the product.

EXAMPLE 9

Etherification of starch with benzyl chloride in a water suspension while adding no salt during additions of alkali after the initial addition Commercial, ungelatinized corn starch suspension at 35–40% solids concentration is pumped to a reaction vessel through an "in-line" mixer (e.g. centrifugal pump)

at a rate of 1–10 gallons per minute. A mixture of 30% NaOH solution containing 2.0–2.5% (e.g. 2.25%) of dry basis NaOH based on total starch solids and 26% NaCl solution containing 8% NaCl based on total initial water in the starch suspension is injected into the starch suspension stream in the "in-line" mixer at the point of maximum turbulence at a rate adjusted to add from 2.0 to 2.5 (e.g. 2.25%) parts of NaOH per 100 parts of starch solids which are passing through the "in-line" mixer. To the alkaline suspension is added an aralkyl chloride capable of reacting monofunctionally with alkaline starch to introduce groups attached by the ether linkage, for example, benzyl chloride or ring substituted benzyl chloride (e.g. p.chlorobenzyl chloride).

The aralkyl chloride reaction is conducted at 115–120° F. The rate of reaction is followed by periodically titrating an aliquot of the suspension to determine the alkali consumption as the alkalinity becomes lower additional alkali in the form of a solution having 10% NaOH concentration and containing no NaCl is injected into a stream of the reaction suspension in an "in-line" mixer through which the reaction suspension is being circulated in and out of the reaction vessel. By this means, the alkalinity of the reaction suspension is maintained at a level between 1 and 2.5 parts of NaOH per 100 parts of starch solids. The reaction is continued until from 0.05 to 0.5 mole of aralkyl chloride per $C_6H_{10}O_5$ mole of starch has been hydrolyzed, as indicated by the cumulative amount of alkali consumed. The suspension of etherified starch is neutralized, if desired, or left in the alkaline state. Purification by dilution and dewatering or suitable combinations of dilution, dewatering and washing of the filter cake is feasible due to the ungelatinized granule form of the products.

The above process uses relatively low proportions of added salt to prevent swelling as contrasted, for instance, with the proportions of Pat. 2,773,057 in Example VI.

DISCUSSION OF DRAWINGS

In the attached drawings, flow sheets and apparatus for use in practicing the method of this invention are diagrammatically illustrated.

Referring first to the flow sheet of FIG. 1, the granule starch slurry is shown being introduced into a holding tank 10, which may be equipped with an agitator. The slurry is withdrawn from tank 10 through a valve controlled line 11, passing to the intake side of a mixing pump 18, which may be a centrifugal pump. If desired, tank 10 can be omitted and the slurry supplied directly from a standard wet milling plant.

The flow through the pump 18 and into line 12 is turbulent, that is, non-laminar. For the initial charging of the reaction vessel 20, the alkali-salt solution is transferred through a valve controlled line 13 from a storage tank 14, by means of an injection pump 15, such as a positive displacement pump. The line 13 can be equipped with a flow indicator 16, such as a Rotameter and passed through a valve-controlled line 17 to a peripheral inlet in pump housing 19, as indicated. The alkali-salt solution is thus injected into the pump housing under pressure for immediate substantial instantaneous admixture with a portion of the starch slurry passing through the pump 18 in turbulent flow. The immediately formed mixture of the slurry and alkali-salt solution is transferred through line 12 to reaction vessel 20, which may be equipped with an agitator as indicated. Preferably, all of the starch slurry charged to the reaction vessel 20 passes through pump 18, and the alkali-salt solution is proportioned to achieve an initial concentration within the reaction vessel in accordance with the concentrations set out above. Vessel 20 preferably has a capacity of 10,000–15,000 gallons.

With this method of introducing the alkali for activation of the starch, soluble losses can be reduced and other related advantages obtained as described in the above cited copending application, Ser. No. 774,694 now Pat. No. 3,632,803. Alternatively, however, the starch slurry can be introduced into the reaction vessel 20 without prior contact with the alkali. The alkali-salt solution can then be metered slowly into the reaction vessel operating the agitator to avoid local over-concentration of the alkali until the desired initial concentration of the alkali and salt is achieved. This method is not as advantageous as where the alkali-salt solution is metered into, and uniformly proportioned in relation to the slurry in mixing pump 18, or equivalent device, but it can be used while still achieving part of the advantages of this invention.

The alkali-consuming etherifying agent is introduced into the reaction vessel 20 to start the etherification reaction, the introduction being continued as the reaction proceeds. The reaction vessel 20 may be provided with means to maintain the slurry at the optimum reaction temperature. As explained previously, the slurry is maintained at a temperature promoting the etherification reaction but not a temperature so high that the starch granules are swollen to a non-filterable state.

As the etherification reaction proceeds, the alkali concentration in vessel 20 will be gradually reduced. The utilization of alkali can be followed by withdrawing and analyzing samples. When the alkali concentration reaches a minimum control level, such as, for example, 1 part of alkali per each 100 parts of starch, additional alkali is added.

In FIG. 1, one method of carrying out the alkali addition in accordance with the present invention is illustrated. The partially etherified starch slurry of reduced alkali content is withdrawn through the valve controlled line 22, and passed through the valve controlled line 23, the valve on line 21 being closed. The withdrawn portions of the starch slurry are recycled to the top of the reaction vessel through the line 11, the outlet valve from tank 10 being closed. The slurry passes through the pump 18 and the line 12, thereby being re-cycled to the reaction vessel 20. This re-cycling circulation can be intermittent or continuous. When the re-cycling flow is operated more or less continuously, the monitoring of the alkali level in the reaction vessel can be carried out by withdrawing samples through a sample line 24, from the re-circulation line 23. When it is desired to add additional alkali to permit the reaction to be continuous while maintaining the alkali concentration within the specified range, this can be readily accomplished by introducing an alkali or alkali-salt solution into the outer periphery of the housing 19 of pump 18, in the same manner used for the original charge. As shown in FIG. 1, the alkali solution is withdrawn from storage tank 14 through line 13, and passed through an injection pump 15 and the flow indicator 16 to the line 17 which connects with the pump housing 19. The added alkali is thereby combined with the recirculated slurry which is in turbulent flow, resulting in substantially instantaneous uniform mixing.

It would be apparent that with the recycle arrangement of FIG. 1, it will be feasible to meter additional amounts of alkali or alkali and salt into the recirculating portions of the slurry at a rate in proportion to the consumption of alkali in the reaction vessel 20, thereby making it possible to maintain the alkali and salt concentration of the reacting slurry within a narrow concentration range. For example, the alkali concentration can be controlled between limits of 2.5 parts of alkali per 100 parts of starch at the start of the reaction down to a minimum concentration of 1.5 parts of alkali per 100 parts of starch before the intermittent alkali addition is started. When the alkali concentration drops to the 1.5 part level, injection pump 15 can be started, and sufficient alkali is added to restore the concentration of the alkali within the reaction vessel to 2.5 parts. It will be understood that the added salt should be proportioned to the amount of water being added in the alkali-salt solution so that the maximum salt concentration within reaction vessel 20 does not exceed the limits specified above, that is, not over 10 parts by weight of added salt for each part of total water, or preferably not over 8 parts of added salt per 100 parts of total water (including the water of the original slurry and the water added with the alkali-salt solution both originally and during the incremental additions).

When the desired substitution level has been reached, and after neutralization, if desired, the etherified starch is withdrawn through line 22 and passed through line 21, the valve on line 23 being closed. The reacted starch is subjected to filtration, washing and drying in accordance with well known processing procedures. As compared with standard processes, however, the product will contain less salt, and other advantages are realized such as reduction in soluble loss and improved filtration rates.

In FIG. 2, a modified flow sheet is shown. In this embodiment, the valve-controlled line 100 is connected directly to the supply line from the starch plant and no holding tank is used. As with the embodiment in FIG. 1, the alkali or alkali-salt solution is stored in a tank 105. The solution is removed through a valve-controlled line 106 by pump 107 and passed through a line 108, which may be equipped with a flow meter 109, and introduced at the intake of pump 103 in metered proportion flow, together with the starch suspension from line 100. Inside the pump 107, the turbulent flowing stream of the starch suspension is thoroughly, instantaneously, and uniformly mixed with the alkali or alkali-salt solution, and passed to the reaction vessel by line 111 to provide the initial charge for the etherification reaction.

In accordance with the present invention, there is provided a valve controlled re-cycle line 112 through which portions of the slurry can be re-cycled through pump 107 and line 111. As explained with reference to the flow sheet of FIG. 1 the alkali concentration can be followed analytically, and when additional alkali is required, it will be introduced through line 108 into the pump 107.

In FIGS. 3 and 4, alternate in-line mixing devices are shown. FIG. 3 illustrates the jet-type mixer, while FIG. 4 illustrates a mechanical-type mixer. As shown in FIG. 3, the initial or recycle starch slurry is pumped through a pipe 200, having a restricted section providing a Venturi 201. The alkali or alkali-salt solution is pumped to an ejector nozzle 202, which discharges the solution into the slurry immediately upstream of the Venturi 201. As the slurry and solution pass through the Venturi, agitation and turbulence is produced. The alkali and starch granules are thereby substantially instantaneously mixed. The uniformly alkalized starch granules are then passed, or returned, to the reaction vessel.

As shown in FIG. 4, the initial or recycle slurry can be supplied to the in-line mixer 300 through pipe 301. The alakli or alkali-salt solution is supplied through an opposed inlet 302 under pump pressure and merges with the incoming stream of starch and is subjected to mechanical agitation by the paddle blades 305, which are mounted on a shaft 306, driven by motor 307. Here again, substantially instantaneous mixing of the alkali with the starch granules is obtained, and the uniformly alkalized granules are discharged to the outlet 304. In the showing of these various modifications, it will be apparent that the invention is of broad applicablity, and is not dependent on a specific type of in-line mixing device, the critical feature being the mixing of the alkali into the turbulently flowing stream, at least for the incremental additions thereof during the reaction.

The method described in the foregoing application is particularly advantageous where the reaction suspension is or becomes thixotropic. Where the etherification reaction is conducted at a relatively high solids concentration, and especially where the starch is being etherified to a relatively high degree of substitution with hydrophobic ether groups, the suspension may become increasingly thixotropic as the reaction proceeds. With conventional methods of adding increments of the alkali etherification catalyst, the thixotropic nature of the suspension will result in low turbulence and poor dispersal of the alkali or alkali-salt solution which is added to the suspension in the reaction tank under normal agitation of the contents thereof. In developing the present invention, it was discovered that starches which have been substituted to a higher level with hydrophobic groups, such as benzyl, form suspensions in water which are thixotropic in nature. Such thixotropic suspensions become fluid under the influence of mechanical disturbances such as agitation or vibration but tend to gel or at least become somewhat semi-solid when at rest. It is therefore difficult to add alkali solution directly to the surface of such suspensions without causing alkali-swelling of the starch. Even though the alkali may be added at a point which is being highly agitated, for example by a propeller, the suspension tends to become semi-solid in areas adjacent to or a short distance away from the agitated area. This effect tends to prevent the alkali solution from becoming distributed rapidly throughout the total suspension and results in localized swelling of the starch by the alkali. However, with the "in-line" addition of alkali solutions of the present process the alkali is instantaneously distributed in the suspension in the desired final ratio and the thixotropy of the suspension does not affect the distribution. The method of this invention therefore has a particular application where the starch solids on a dry basis at the start of the reaction comprise at least 35% by weight of the reaction mixture. Usually the initial solids concentration will be within the range from 35 to 45% by weight of the reaction mixture. For reacting the starch with benzyl chloride, or similar reagent, an advantageous initial solids concentration is from about 35 to 41% by weight. At the conclusion of the reaction, the etherified starch on a dry basis will comprise at least 25% by weight of the reaction mixture. A satisfactory range will usually be about 25 to 35% dry etherified starch on the final reaction mixture. For benzyl chloride, or similar reagent, an advantageous final etherified starch solids range is from about 27 to 33% by weight of the final reaction mixture. The class of etherifying reagents, which when reacted with starch in the amount of at least .05, and more especially with at least 0.8 mole per $C_6H_{10}O_5$ moles of starch, are those etherifying reagents reacting monofunctionally with starch to introduce ether-linked hydrophobic groups selected from alkyls of 3 to 12 carbons and aralkyls of 7 to 12 carbons. Specific reagents within this class are set out in the foregoing specification, and include reagents such as benzyl chloride, butyl chloride, amyl chloride, allyl chloride, methallyl chloride, octenyl chloride, dodecenyl chloride, 3-chloro propenyl benzene, p-chloro benzyl chloride, and p-nitrobenzyl chloride.

We claim:

1. The method of controlling the etherification of granule starch with an alkali-consuming monofunctional etherifying reagent in a batch-type reaction vessel, consisting essentially of:

(a) forming an initial reaction mixture from a water suspension of granule starch, an alkali etherification catalyst, and an inorganic salt starch swelling inhibitor, said alkali catalyst being present in a concentration within the range from 0.5 to 4.0 parts by weight per 100 parts of dry starch, said salt inhibitor being present at the beginning of the reaction at a concentration within the range from 3 to 15 parts by weight per each 100 parts of the total water of said reaction mixture;

(b) reacting said reaction mixture in said reaction vessel with at least .05 mole of an alkali-consuming monofunctional organic etherifying reagent per $C_6H_{10}O_5$ mole of starch at a temperature promoting the reaction of said starch with said etherifying reagent without swelling said starch to a non-filterable state;
(c) withdrawing portions of said reaction mixture from said reaction vessel during the course of said reaction and forming the withdrawn portions into a turbulently flowing stream outside said reaction vessel;
(d) injecting into said turbulently flowing stream a water solution of additional amounts of said alkali etherification catalyst to replenish the alkali catalyst consumed by reaction with said alkali-consuming etherifying reagent; and
(e) returning said withdrawn portions to said reaction vessel with said injected solution in admixture therewith, said additional amounts of said alkali catalyst being proportioned to substantially maintain the concentration thereof in said reaction vessel during said reaction within the range from 0.5 to 4.0 parts of alkali per 100 parts starch based on the initial dry starch, said salt inhibitor concentration during said reaction in said reaction vessel being limited to not over 15 parts by weight per 100 parts total water of the reaction mixture.

2. The method of claim 1 in which said alkali catalyst and said salt inhibitor are maintained in said reaction mixture within said reaction vessel, respectively, at concentrations within the range for said catalyst of 1.5 to 3.5 parts by weight per each 100 parts of said initial dry starch and for said inhibitor of from 3 to 12 parts by weight per 100 parts of said total water.

3. The method of claim 1 in which said etherifying reagent is a monochlorine substituted organic etherifying reagent reacting monofunctionally with starch and in which the chlorine atom is attached to a single-bonded carbon atom in an aliphatic chain.

4. The method of claim 1 in which said etherifying reagent reacts monofunctionally with said starch to introduce an ether-linked hydrophobic group selected from alkyls of 3 to 12 carbons and arallkyls of 7 to 12 carbons.

5. The method of claim 1 in which said etherifying reagent is benzyl chloride.

6. The method of claim 2 in which said etherifying reagent is benzyl chloride.

7. The method of claim 1 in which said initial reaction mixture is prepared outside said reaction vessel from water suspension of alkali-free granule starch by a method including the stages of forming said suspension into a turbulently flowing stream, continuously injecting into said stream proportionate amounts of a water solution of said alkali-catalyst and said salt inhibitor, and passing the resulting suspension to said reaction vessel for reaction therein as set out in claim 1.

8. The method of claim 1 in which at least .08 mole of said etherifying reagent are reacted per $C_6H_{10}O_5$ mole of said starch.

9. The method of controlling the etherification of granule starch with an alkali-consuming monofunctional etherifying reagent in a batch-type reaction vessel, consisting essentially of:
(a) forming an initial reaction mixture from a water suspension of granule starch, an alkali etherification catalyst, and an inorganic salt starch swelling inhibitor, said alkali catalyst being present in a concentration within the range from 1.5 to 3.5 parts by weight per 100 parts of dry starch, said salt inhibitor being present in a concentration within the range from 3 to 12 parts by weight per 100 parts of the total water of said reaction mixture;
(b) reacting said reaction mixture in said reaction vessel with at least .08 mole of an alkali-consuming monofunctional organic etherifying reagent per $C_6H_{10}O_5$ mole of starch at a temperature promoting the reaction of said starch with said etherifying reagent without swelling said starch to a non-filterable state;
(c) withdrawing portions of said reaction mixture from said reaction vessel during the course of said reaction and forming the withdrawn portions into a turbulently flowing stream outside said reaction vessel;
(d) injecting into said turbulently flowing stream a water solution of additional amounts of said alkali etherification catalyst and said salt inhibitor to replenish the alkali catalyst consumed by reaction with said alkali-consuming etherifying reagent; and
(e) returning said withdrawn portions to said reaction vessel with said injected solution in admixture therewith, said additional amounts of said alkali catalyst and said salt inhibitor being proportioned to maintain the aforesaid concentrations thereof in said reaction vessel within said stated ranges.

10. The method of claim 9 in which said etherifying reagent is a monochlorine substituted organic etherifying reagent reacting monofunctionally with starch and in which the chlorine atom is attached to a single-bonded carbon atom in an aliphatic chain.

11. The method of claim 9 in which said etherifying reagent reacts monofunctionally with said starch to introduce an ether-linked hydrophobic group selected from alkyls of 3 to 12 carbons and aralkyls of 7 to 12 carbons.

12. The method of claim 9 in which said etherifying reagent is benzyl chloride.

13. The method of claim 11 in which the starch solids on a dry basis comprise at the start of said reaction from 35 to 45% by weight of the reaction mixture, and in which the etherified starch on a dry basis at the conclusion of said reaction comprises from 25 to 35% by weight of the reaction mixture.

14. The method of controlling the etherification of granule starch with an alkali-consuming monofunctional etherifying reagent in a batch-type reaction vessel, consisting essentially of:
(a) forming an initial reaction mixture from a water suspension of granule starch, an alkali etherification catalyst, and an inorganic salt starch swelling inhibitor, said starch comprising from 35 to 45% by weight of the reaction mixture, said alkali catalyst being present in a concentration within the range from 0.5 to 4.0 parts by weight per 100 parts of dry starch, said salt inhibitor being present at the beginning of the reaction at a concentration within the range from 3 to 15 parts by weight per each 100 parts of the total water of said reaction mixture;
(b) reacting said reaction mixture in said reaction vessel with at least .08 mole of an alkali-consuming monofunctional organic etherifying reagent per $C_6H_{10}O_5$ mole of starch at a temperature promoting the reaction of said starch with said etherifying reagent without swelling said starch to a non-filterable state, the etherified starch at the conclusion of said reaction comprising form 25 to 35% by weight of the reaction mixture;
(c) withdrawing portions of said reaction mixture from said reaction vessel during the course of said reaction and forming the withdrawn portions into a turbulently flowing stream outside said reaction vessel;
(d) injecting into said turbulently flowing stream a water solution of additional amounts of said alkali etherification catalyst to replenish the alkali catalyst consumed by reaction with said alkali-consuming etherifying reagent; and
(e) returning said withdrawn portions to said reaction vessel with said injected solution in admixture therewith, said additional amounts of said alkali catalyst being proportioned to substantially maintain the concentration thereof in said reaction vessel during said reaction within the range from 0.5 to 4.0 parts of alkali per 100 parts starch based on the initial dry starch, said salt inhibitor concentration during said reaction in said reaction vessel being limited to not over 15 parts by weight per 100 parts total water of the reaction mixture.

15. The method of claim 14 in which said etherifying reagent is benzyl chloride, and said alkali catalyst and said salt inhibitor are maintained in said reaction mixture within said reaction vessel, respectively, at concentrations within the range for said catalyst of 1.5 to 3.5 parts by weight per each 100 parts of said initial dry starch and for said inhibitor of from 3 to 12 parts by weight per 100 parts of said total water.

References Cited

UNITED STATES PATENTS 3,462,283   8/1969   Hjermstad et al. ____ 106—213

DONALD E. CZAJA, Primary Examiner

M. I. MARQUIS, Assistant Examiner

U.S. Cl. X.R.

260—233.5